(12) United States Patent
Newman et al.

(10) Patent No.: US 12,157,783 B2
(45) Date of Patent: Dec. 3, 2024

(54) SELECTIVELY WETTABLE AND OXYGEN-PERMEABLE LENSES

(71) Applicant: MENICON SINGAPORE PTE LTD., Singapore (SG)

(72) Inventors: Stephen D. Newman, Singapore (SG); Tasuku Watanabe, Singapore (SG)

(73) Assignee: Menicon Co., Ltd., Nagoya (JP)

( * ) Notice: Subject to any disclaimer, the term of this patent is extended or adjusted under 35 U.S.C. 154(b) by 732 days.

(21) Appl. No.: 17/298,018

(22) PCT Filed: Nov. 30, 2019

(86) PCT No.: PCT/SG2019/050592
§ 371 (c)(1),
(2) Date: May 27, 2021

(87) PCT Pub. No.: WO2020/112030
PCT Pub. Date: Jun. 4, 2020

(65) Prior Publication Data
US 2022/0169765 A1 Jun. 2, 2022

Related U.S. Application Data

(60) Provisional application No. 62/773,402, filed on Nov. 30, 2018.

(51) Int. Cl.
| | | |
|---|---|---|
| *C08F 220/28* | (2006.01) | |
| *B29D 11/00* | (2006.01) | |
| *B29K 33/00* | (2006.01) | |
| *B29K 105/00* | (2006.01) | |
| *C08F 30/08* | (2006.01) | |
| *C08F 230/08* | (2006.01) | |
| *C08L 43/04* | (2006.01) | |
| *G02B 1/04* | (2006.01) | |
| *G02C 7/04* | (2006.01) | |

(52) U.S. Cl.
CPC .... *C08F 220/281* (2020.02); *B29D 11/00038* (2013.01); *C08F 30/08* (2013.01); *C08F 230/08* (2013.01); *C08L 43/04* (2013.01); *G02B 1/04* (2013.01); *G02B 1/043* (2013.01); *G02C 7/04* (2013.01); *B29K 2033/12* (2013.01); *B29K 2105/0002* (2013.01); *B29K 2105/0061* (2013.01); *C08F 2800/20* (2013.01)

(58) Field of Classification Search
CPC .... C08F 220/281; C08F 30/08; C08F 230/08; C08F 2800/20; C08L 43/04; B29D 11/00038; B29K 2033/12; B29K 2105/0002; B29K 2105/0061; G02B 1/04; G02B 1/043; G02C 7/04
See application file for complete search history.

(56) References Cited

U.S. PATENT DOCUMENTS

| | | | |
|---|---|---|---|
| 4,555,372 A | * 11/1985 | Kunzler | G02C 7/041 264/2.7 |
| 6,346,594 B1 | 2/2002 | Watanabe et al. | |
| 8,980,972 B2 | 3/2015 | Driver | |
| 2012/0133064 A1 | 5/2012 | Newman | |
| 2013/0059926 A1 | 3/2013 | Driver et al. | |
| 2017/0088564 A1 | 3/2017 | Iyer et al. | |

FOREIGN PATENT DOCUMENTS

| | | |
|---|---|---|
| CN | 102803350 A | 11/2012 |
| CN | 103214636 A | 7/2013 |
| CN | 104066756 A | 9/2014 |
| CN | 104169289 A | 11/2014 |
| EP | 0989138 A2 | 3/2000 |
| WO | 2010147779 A2 | 12/2010 |
| WO | 2013033553 A1 | 3/2013 |
| WO | 2013070306 A1 | 5/2013 |

OTHER PUBLICATIONS

Database Biosis [Online] Biosciences Information Service, Philadelphia, PA, US; Jun. 2015 (Jun. 2015), Iyer Ananth Vet al: "Polymerizable silicone compatibilizers for silicone hydrogels".
Supplementary Partial European Search Report for EP Application No. 19889730.8 dated Mar. 3, 2023.
Lin , et al., "Surface-hydrophilic and protein-resistant tris(trimethylsiloxy)-3-methacryloxypropyl silane-containing polymer by the introduction of phosphorylcholine groups", Colloids and Surfaces A: Physiochemical and Engineering Aspects, vol. 384, No. 1-3, Jul. 1, 2011, pp. 713-719, XP55934792, Amsterdam, NL.
Shimizu , et al., "Super-hydrophilic silicone hydrogels with interpenetrating poly(2-methacryloyloxyethyl phosphorylcholine) networks", Biomaterials, Elsevier, Amsterdam, NL, vol. 31, No. 12, Apr. 1, 2010 (Apr. 1, 2010), pp. 3274-3280, XP027575369, ISSN: 0142-9612 [retrieved on Feb. 1, 2010].
Search Report and Written Opinion for Singapore Application No. 11202105594T dated Sep. 3, 2022.
International Search Report and Written Opinion for International Application No. PCT/SG2019/050592, mailed Mar. 24, 2020.

\* cited by examiner

*Primary Examiner* — Patrick D Niland
(74) *Attorney, Agent, or Firm* — Dorsey & Whitney LLP

(57) ABSTRACT

A contact lens includes a body, having the plurality of monomers including at least some silicone monomer units including at least one zwitterionic distributed throughout the body. The contact lens includes a front surface and a back surface, where the silicone monomer including at least one zwitterionic group can be present in a greater concentration nearest the front surface than the back surface or a point therebetween. The contact lens can be formed by casting a polymer mixture containing the silicone monomer including at least one zwitterionic group.

21 Claims, 5 Drawing Sheets

400

Applying a liquid lens material into a spin casting mold, wherein the liquid lens material includes a hydrogel polymer mixture having a plurality of monomers, the plurality of monomers including at least some 3,5,8,13-tetraoxa-4-phospha-12,14-disilapentadecan-1-aminium,4-hydroxy-N,N,N,12,14,14-hexamethyl-6-[[(2-methyl-1-oxo-2-propen-1-yl)oxy]methyl]-12-[(trimethylsilyl)oxy]-,inner salt,4-oxide ("SiGMA-PC") monomer units  ~410

Spinning the spin casting mold  ~420

*Fig. 3*

SELECTIVELY WETTABLE AND OXYGEN-PERMEABLE LENSES

BACKGROUND

Emmetropia is a state of vision where a viewer sees objects clearly at both near and far distances. The cornea and crystalline lens collectively focus the light entering the eye to the central regions of the retina. Emmetropia is achieved when the collective refractive powers of the cornea and crystalline lens focus light exactly on the central portion of the retina.

Myopia is a vision condition where objects near to a viewer appear clear, but objects that are spaced farther away from the viewer get progressively blurred. Myopia is sometimes referred to as being nearsighted. Myopia can be caused by multiple factors. A significant factor for many cases of myopia include an elongated axial length of the eye. Myopia occurs when the focal point of the focused light is formed before the retina. In other words, the focus of the light rays entering the eye occurs prior to reaching the retina.

Another condition that is affected by the eye's axial length is hyperopia. This condition causes the viewer to see objects at a distance clearly, while the objects close to the viewer are progressively blurred. While this condition can also be caused by multiple factors, a person has hyperopia if the focal point of the focused light is formed behind the retina.

The axial length of the eye grows as children age. As young people begin their young adulthood years, the eye generally stops growing and the axial length of the eye becomes more permanent. Thus, if the growth of the eye's axial length can be controlled during a child's youth, myopia or hyperopia can be reduced or even eliminated in the child's adulthood years.

Consistent wearing and use of a contact lens, especially by children, is dependent on the comfort experienced by the user during use. Often, contact lenses will dry out, irritate a user's eyelid, and/or prevent sufficient oxygen to a user's eye. Consequently, a contact lens based solution should offer maintained comfort during use.

SUMMARY

A number of representative embodiments are provided to illustrate the various features, characteristics, and advantages of the disclosed systems and methods. It should be understood that the features, characteristics, advantages, etc., described in connection with one embodiment can be used separately or in various combinations and sub-combinations with other features described in connection with other embodiments.

According to one exemplary embodiment, a composition includes at least one silicone monomer. According to this example, the silicone monomer includes at least one zwitterionic group and the composition is 0.1-9 wt % silicone.

According to one exemplary embodiment, a composition includes at least one silicone monomer and the silicone monomer can have a single zwitterionic group and the composition can be 0.1-9 wt % silicone.

According to one exemplary embodiment, the composition includes at least one silicone monomer and the silicone monomer can have a single zwitterionic group and the composition can be 0.1-9 wt % silicone. According to one exemplary embodiment, the zwitterionic group includes a phosphorylcholine.

According to one exemplary embodiment, a composition includes at least one silicone monomer and the silicone monomer includes at least one zwitterionic group, with the composition being between 0.1-9 wt % silicone. According to one exemplary embodiment, the relaxation rate of the composition is less than 5.5%.

According to one exemplary embodiment, a composition includes at least one silicone monomer wherein the silicone monomer wherein the silicone monomer includes at least one zwitterionic group, and wherein the composition includes between 0.1-9 wt % of the silicone monomer. According to one exemplary embodiment, the relaxation rate is less than 4.0%.

According to one exemplary embodiment, a composition includes at least one zwitterionic silicone monomer and the silicone monomer, with the composition containing between 0.1-9 wt % of the silicone monomer. According to one exemplary embodiment, the dynamic friction of the composition is less than 40 mN. According to one exemplary embodiment, a composition includes at least one silicone monomer and the silicone monomer includes at least one zwitterionic group, with the composition being between 0.1-9 wt % silicone. According to one exemplary embodiment, the silicone-monomer includes isomers conforming to formulae (Ia) to (Ic):

(Ia)

(Ib)

(Ic)

Wherein:

$R^1$ is a group containing a polymerizable moiety comprising, but not limited to, methacryloyl, acryloyl, styryl, or allyl;

$R^2$ is a group containing a C1-C15 alkenyl group terminated in a silicone moiety of structure (II), where $R^2$ is a group containing a C1-C15 alkenyl group terminated in a silicone moiety of structure (II), where $R^4$ is either $-CH_3$ or $-[-Si(CH_3)_2-O-]_n-Si(CH_3)_3$ where n=0-50;

$R^3$ is a zwitterionic group, including, but not limited to phosphorylcholine, betaine, sulfobetaine, or amphoacetate.

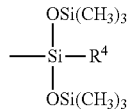
(II)

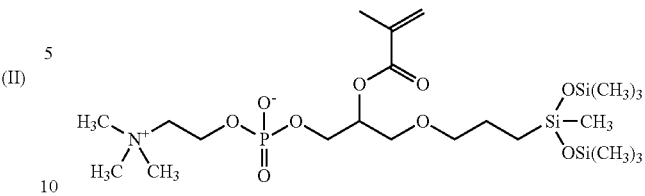
(IV)

In one embodiment, a contact lens is disclosed. The contact lens includes a body having
a hydrogel polymer including a plurality of monomers, the plurality of monomers including at least some SiGMA-PC monomer units distributed throughout the body, a front surface configured to face away from a wearer, and a back surface configured to contact an eye of the wearer, the SiGMA-PC monomer units being formed from the chemical structure represented by the formula (III):

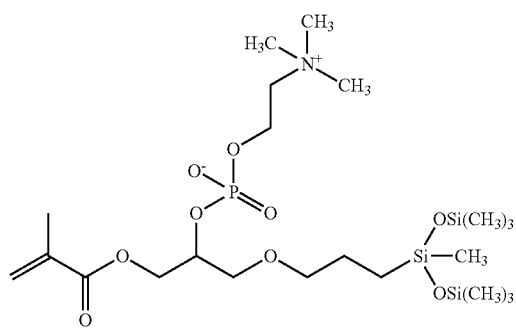
(III)

Additionally, the SiGMA-PC monomer units being formed from the chemical structure can comprise either of the isomer structures illustrated in formulae (IV) and (V), or mixtures thereof:

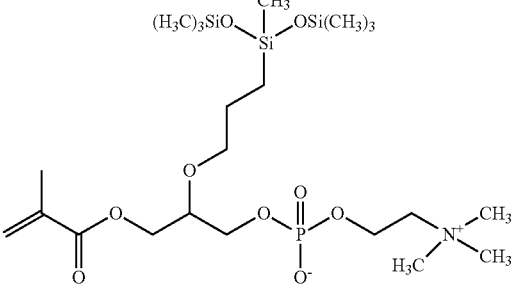
(V)

For the purposes of clarity, references to SiGMA-PC henceforth will refer to any of the structures of formulae (III), (IV), or (V) or mixtures thereof. It is further recognized that the major component of such mixtures will be represented by structure (III), followed by structure (IV). The isomer where the polymerizable methacryloyl group is attached to the center hydroxyl group of the glyceryl moiety (i.e. structure (V)) is recognized as the minor isomer.

In a second embodiment, a contact lens is disclosed wherein the contact lens includes a body having a hydrogel polymer including a plurality of monomers, the plurality of monomers including at least some SiMA-PC monomer units distributed throughout the body, a front surface configured to face away from a wearer, and a back surface configured to contact an eye of the wearer, the SiMA-PC monomer units being represented by the chemical structure (VI):

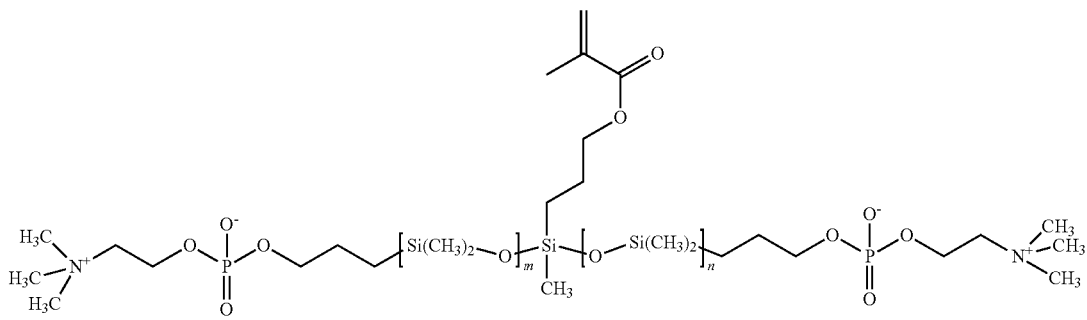
(VI)

Where m+n≈5; avg. M 990 g/mol. The SiMA-PC monomer is further detailed in U.S. Pat. No. 8,980,972, which patent is incorporated by reference for all that it discloses, and will hereafter be referred to as the SiMA-PC monomer.

In an embodiment, a contact lens is disclosed. The contact lens includes a body having a hydrogel polymer including a plurality of monomers, the plurality of monomers including a silicone monomer including at least one zwitterionic group. According to one exemplary embodiment, the plurality of monomers include SiGMA-PC monomer units distributed throughout the body. The body includes a front surface configured to face away from a wearer and a back surface configured to contact an eye of the wearer. The body includes a greater amount of SiGMA-PC at the front surface than a point in the body between the front surface and the back surface. The body includes a greater water retention or water content concentration at the front surface than the back surface.

In an embodiment, a method of making a contact lens is disclosed. The method includes applying a liquid lens material into a spin casting mold. The method includes spinning the spin casting mold. The liquid lens material includes a mixture having a plurality of monomers, the plurality of monomers including a silicone monomer including at least one zwitterionic group. According to one exemplary embodiment, the plurality of monomers include at least some "SiGMA-PC" monomer units.

Silicone hydrogel polymer compositions containing SiGMA-PC monomer units dispersed therethrough are disclosed.

BRIEF DESCRIPTION OF THE DRAWINGS

The accompanying drawings illustrate various embodiments of the principles described herein and are part of the specification. The illustrated embodiments are merely examples and do not limit the scope of the claims.

FIG. 3 is a block diagram of one embodiment of a method for making a contact lens, according to the principles of the present disclosure.

Throughout the drawings, identical reference numbers designate similar, but not necessarily identical, elements.

DETAILED DESCRIPTION

Figure 1:
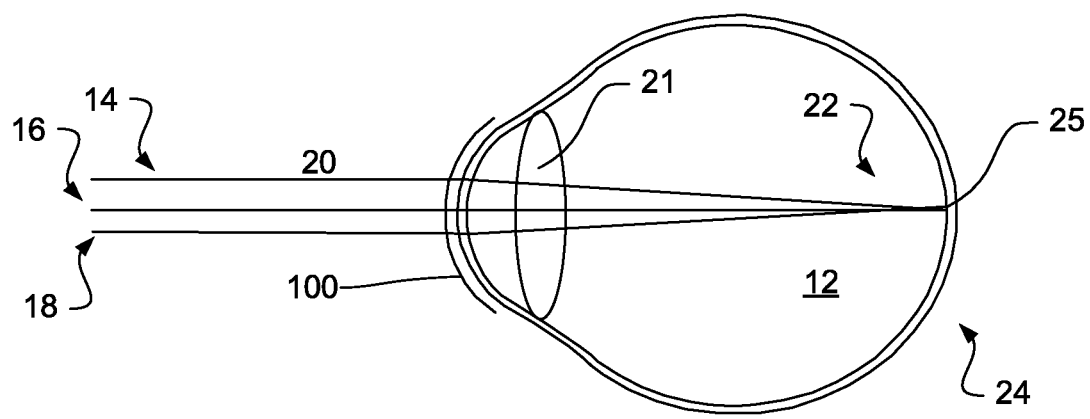
FIG. 1 is cross-sectional view of one embodiment of a contact lens directing light into an eye, according to the principles of the present disclosure.

This disclosure relates to lenses including silicone hydrogels including a plurality of monomers including a silicone monomer having at least one zwitterionic group. According to one exemplary embodiment, the silicone hydrogels include a plurality of monomers including SiGMA-PC monomer units and/or SiMA-PC monomer units distributed throughout the entire lens. For ease of explanation, the following description will primarily be provided in the context of a silicone monomer including at least one zwitterionic group, and more specifically, SiGMA-PC monomer units. However, it will be understood that the SiGMA-PC monomer units described below can be replaced by SiMA-PC monomer units. The lenses disclosed herein can be produced from a single polymer mixture without further surface treatments or coatings. The concentration of the monomer including at least one zwitterionic group can be preferentially higher at the front surface of a lens than the back surface of the lens. As used herein, reference to at least one zwitterionic group can mean one or more zwitterionic groups including, but not limited to, phosphorylcholine, sulfobetaine, amphoacetate, and mixtures thereof, etc. Methods of making and using the lenses are also disclosed. The concentration of the monomer including at least one zwitterionic group at the surface of the lenses can be controlled by selectively controlling the energy domains of molding surfaces and environmental interfaces used to form the lenses.

Silicon-containing hydrogels (silicone hydrogels) contain silicone or silicone components and are therefore generally hydrophobic, unless treated to increase hydrophilicity. As recognized in the art, silicone hydrogels tend to show a relatively higher oxygen transmissibility, as oxygen can be transported via the silicone containing polymer, rather than just the water contained within the hydrogel, which is the case in non-silicone hydrogels. If the silicone hydrogel is treated to increase hydrophilicity, the lenses can lose some of this additional oxygen transmissibility. Thus, it is difficult to balance the relatively high hydrophobicity of silicone hydrogels with oxygen transmissibility. Because silicon-containing materials in hydrogels tend to reduce wettability, silicone hydrogel contact lenses often exhibit a relatively low water content. The relatively low water content of silicone hydrogel contact lenses increases friction with the eyelid during use and can cause perceptible discomfort.

The lenses and techniques of forming the same disclosed herein balance surface wettability, water retention, oxygen transmissibility, selective transmittance of light, and strength. The lenses disclosed herein provide relatively high wettability, relatively high water retention at the surface (e.g., front surface) of the lenses, relatively high oxygen transmissibility, and provide selective transmittance of violet light over similarly formed lenses. Additionally, the comfort of the exemplary disclosed lenses are optimized to have a high comfort level, as exhibited by a desirable relaxation rate and dynamic friction value. The above-noted properties are provided without sacrificing strength (e.g., modulus of elasticity). The contact lenses described herein can be made via spin casting or cast molding a single polymer mixture, such as making contact lenses with a spin casting process that enables exact copies of contact lenses to be made at a more cost effective rate than other processes, such as cutting on a lathe or multi-layer casting.

Referring now to the figures, FIG. 1 is cross-sectional view of one embodiment of a ophthalmic lens 100 allowing light into an eye 12. In this example, the ophthalmic lens 100 is placed over the eye 12. Ambient light rays 14, 16, 18 enter the eye 12 after having passed through the ophthalmic lens 100. These rays of light are naturally focused by the cornea 20 and crystalline lens 21 of the eye towards a central region 22 of the retina 24. In this example, the contact lens maintains the natural focus of the light. In other words, in this example, the focal point 25 of the light rays 14, 16, 18 form on the central region 22 of the retina 24 whether or not the contact lens is worn. In other examples, however, the contact lens can affect where the focal point of light lands. While these examples depict the light focused on the central region 22 of the retina, light can be naturally focused or defocused on either the central region of the retina and/or the peripheral regions of the retina. In some examples, the contact lens changes the focal points of the light directed towards the peripheral regions of the eye, while in other examples, the contact lens maintains the natural peripheral focus of the light.

In the illustrated example, the ophthalmic lens 100 is depicted as being spaced apart from the eye for illustrative purposes. The ophthalmic lens 100 can directly contact portions of the cornea, the sclera, other portions of the eye, or combinations thereof. In some circumstances, the contact lens can have a direct contact with all portions of the eye that are adjacent to the contact lens. In other examples, some portions of the contact lens can be spaced from the eye so that the eye has no contact in those particular regions with the contact lens, but where the eye is in direct contact with other portions of the eye. In one of these types of examples, the periphery of the contact lens can be in direct contact with the eye while the central portion of the eye is not in direct contact with the eye. In some circumstances where some portions of the eye are not in direct contact with the eye, these portions can be in indirect contact with the eye through a liquid, such as a tear liquid. Where a gap between the eye and the contact lens exists, these gaps can fill with tear liquid produced by the tear duct.

In other examples, the pressure on the eye provided from the contact lens can be uniform across the entire region where the contact lens covers the eye. In other examples, the pressure on the eye can vary across the regions that are covered with the contact lens. In one example, the highest pressure exerted from the contact lens is in the corneal portions of the eye. In another example, the highest pressure exerted from the contact lens is in the scleral portions of the eye. In yet another example, the highest pressures exerted on the eye are at a transition between the corneal portions of the eye and the scleral portions of the eye. In those examples where the highest pressure is exerted to the corneal portions of the eye, the pressure can be uniformly applied. In other examples, the pressures exerted on the cornea can vary across the corneal portions of the eye. For example, the highest pressure on the corneal portions of the eye can be those portions that correspond to the pupil of the eye, while a lower or negative pressure is exerted onto the portions of the cornea that correspond with the iris of the eye.

Any appropriate type of contact lens can be provided and can be used in accordance with the principles described in the present disclosure. For example, the contact lens can be a soft contact lens that is gas (e.g., oxygen) permeable, or any other type of contact lens.

In examples, the ophthalmic lens 100 includes a hydrogel polymer. The hydrogel polymers disclosed herein include a silicone hydrogel polymer that includes a plurality of monomers having at least one zwitterionic group. According to one exemplary embodiment, the silicone hydrogel polymer includes a plurality of monomers including some monomers that contain SiGMA-PC monomer units therein. The SiGMA-PC monomer units can be present throughout the entirety of the silicone hydrogel polymer, or can be selectively distributed to discrete regions of the lens. The silicone hydrogel polymer includes a plurality of additional monomers therein, which are copolymerized with the SiGMA-PC monomers. As explained in more detail below, the plurality of monomers can include at least some SiGMA-PC monomer, at least one methacrylic acid monomer, at least one methacrylic acid salt. A monomer mixture, containing the aforementioned plurality of monomers, used to form the contact lenses can also contain other optional non-polymerizable components such as at least one ether, at least one poloxamer, diphenyl(2,4,6-trimethylbenzoyl)phosphine oxide, polyethylene glycol, or a combination of any the foregoing. According to one example, the at least one ether is a polymerization initiator. This component can become incorporated at the end of a polymer chain and typically works in the UV (360 nm-380 nm) range, but can be mixed with, for example, phosphine oxides to operate in blue light. The poloxamer can, in one exemplary embodiment, be included as a surfactant that will likely wash out of the lens during hydration. The poloxamer surfactant can be used to control mold release during hydration. The diphenyl(2,4,6-trimethylbenzoyl)phosphine oxide can be a polymerization initiator. Additional polymerization initiators, such as benzoin methyl ether (BME), can also be used. This component can become incorporated at the end of a polymer chain. The polyethylene glycol, or similarly propylene glycol (PG), can an inert diluent, which will likely wash out during lens hydration. This component can modify the polymerization of the monomer by pushing back the gel point of the polymerization, thus allowing a more complete polymerization.

According to one exemplary embodiment, a composition includes at least one zwitterionic silicone monomer and the silicone monomer, with the composition containing between 0.1-9 wt % of the silicone monomer. According to one exemplary embodiment, the silicone-monomer includes isomers conforming to formulae (Ia) to (Ic):

(Ia)

(Ib)

(Ic)

Wherein:
- R¹ is a group containing a polymerizable moiety comprising, but not limited to, methacryloyl, acryloyl, styryl, or allyl;
- R² is a group containing a C1-C15 alkenyl group terminated in a silicone moiety of structure (II), where R² is a group containing a C1-C15 alkenyl group terminated in a silicone moiety of structure (II), where R⁴ is either —CH₃ or —[—Si(CH₃)₂—O—]$_n$—Si(CH₃)₃ where n=0-50;
- R³ is a zwitterionic group, including, but not limited to phosphorylcholine, betaine, sulfobetaine, or amphoacetate.

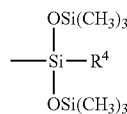

(II)

In one embodiment, a contact lens is disclosed. The contact lens includes a body having a hydrogel polymer including a plurality of monomers, the plurality of monomers including at least some SiGMA-PC monomer units distributed throughout the body, a front surface configured to face away from a wearer, and a back surface configured to contact an eye of the wearer, the SiGMA-PC monomer units being formed from the chemical structure represented by the formula (V):

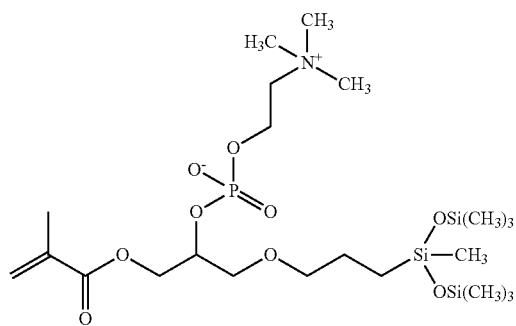

(III)

Additionally, the SiGMA-PC monomer units being formed from the chemical structure can comprise either of the isomer structures illustrated in formulae (IV) and (V), or mixtures thereof:

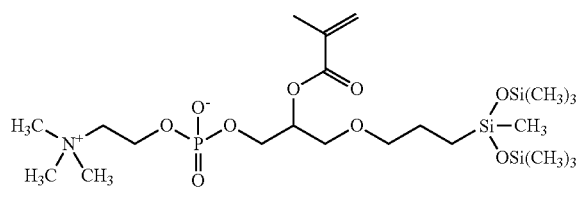

(IV)

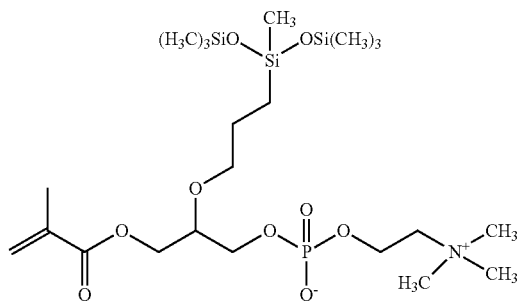

(V)

For the purposes of clarity, references to SiGMA-PC henceforth will refer to any of the structures of formulae (III), (IV), or (V) or mixtures thereof. It is further recognized that the major component of such mixtures will be represented by structure (III), followed by structure (IV). The isomer where the polymerizable methacryloyl group is attached to the center hydroxyl group of the glyceryl moiety (i.e. structure (V)) is recognized as the minor isomer.

In an alternative embodiment, the silicone hydrogel polymer that includes a plurality of monomers having at least one zwitterionic group includes at least some SiMA-PC monomer units, the SiMA-PC monomer units being represented by chemical structure (VI):

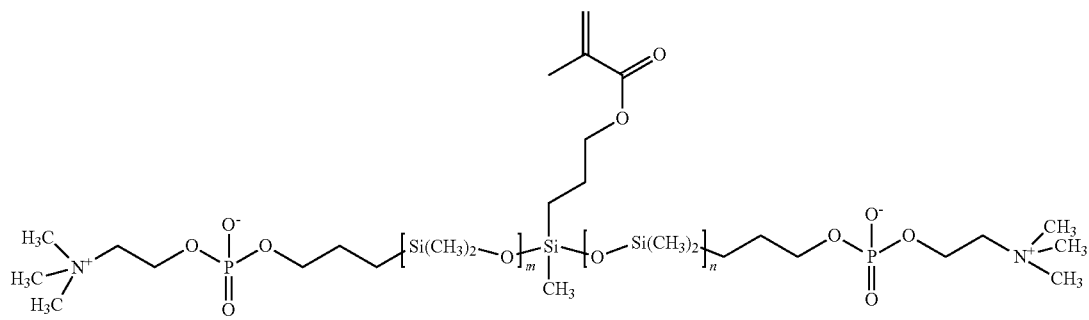

(VI)

Where m+n≈5; avg. M 990 g/mol.

SiGMA-PC includes a Zwitterionic, phosphorylcholine ("PC") substituent group that contains an aminium ion and a phosphate ion. The PC moiety is strongly hydrophilic and can retain 19 water molecules per PC group. During formation (e.g., casting) of a silicone hydrogel polymer body utilizing SiGMA-PC, some of the SiGMA-PC monomers can migrate toward surface of the polymer body and the PC groups can preferentially orient toward the surface of the polymer body. Notwithstanding any migration or orientation of the SiGMA-PC and PC functional groups in the silicone hydrogel polymer body, the silicone hydrogel can include at least some SiGMA-PC monomers dispersed throughout an entirety of the polymer body. Accordingly, in some examples, the SiGMA-PC is not merely deposited on a surface of a polymer body (e.g., contact lens), but is polymerized in the silicone hydrogel polymer, and can be present throughout. The relative higher concentration of PC units near or at the surface of the silicone hydrogel polymer body provides higher surface wetting and water retention characteristics for the lenses disclosed herein, as compared to silicone hydrogels made without PC substituent groups. Such relatively high wettability and water retention provides lubrication between a contact lens surface and the eyelids of a wearer. Accordingly, the silicone hydrogel polymers containing SiGMA-PC disclosed herein are more comfortable to a wearer than conventional silicone hydrogel polymer lenses.

Without wishing to be bound by theory, it is believed that the SiGMA-PC can show surfactant-like behavior, (given that its structure comprises a highly hydrophilic zwitterionic phosphorylcholine headgroup and a hydrophobic silicone tail), and therefore form micelle-like structures. If the concentration of SiGMA-PC is held below its critical micelle concentration, it will tend to concentrate at interfaces such as the mould-monomer interface or the air-monomer interface. At concentrations above the critical micelle concentration (CMC), or the concentration above which micelles form and all additional surfactants added to the system go to micelles, the SiGMA monomer will tend to aggregate and form micelle-like structures within the bulk of the monomer rather than increasing the interface concentration further.

Additionally, the contact lenses disclosed herein have a much higher oxygen transmissivity value (Dk/t) (hereinafter referred to as Dk or Dk value) than conventional hydrogel lenses. The SiGMA-PC monomer units include a bis(trimethylsiloxy)methylsilyl substituent group that is strongly hydrophobic. The bis(trimethylsiloxy)methylsilyl substituent group preferentially orients away from the surface of the silicone hydrogel polymer body, whereas the PC moiety is preferentially expressed at the surface of the lens material. Accordingly, the surface of the silicone hydrogel polymer body containing SiGMA-PC is readily wettable and retains water while the interior of the polymer body is hydrophobic, and therefore provides a relatively high oxygen transmissivity value ((Dk) where Dk is in units of $(10^{-9} (cm \cdot ml \cdot O_2)/(ml \cdot sec \cdot mmHg))$). For example, the Dk value of the silicone hydrogel lenses having the SiGMA-PC disclosed herein can be 50% or even 100% higher than conventional hydrogel lenses, even hydrogel lenses having other PC-containing materials, such as 2-(Methacryloyloxy)ethyl 2-(trimethylammonio)ethyl phosphate (MPC), such as a Dk value of 40, rather than 20.

In some embodiments, the silicone monomer including at least one zwitterionic group, such as the aforementioned SiGMA-PC monomer, can be at least about 0.1 weight percent (wt %) of the silicone hydrogel polymer, such as about 0.1 wt % to 20 wt %, about 0.5 wt % to 15 wt %, about 1 wt % to 10 wt %, about 2 wt % to 5 wt %, about 0.5 wt % to 3 wt %, about 3 wt % to 6 wt %, about 6 wt % to 10 wt %, about 10 wt % to 15 wt %, about 15 wt % to 20 wt %, less than about 20 wt %, less than about 15 wt %, or less than about 10 wt % of the silicone hydrogel polymer (e.g., the polymer body of the contact lens).

As discussed earlier, it is believed that the lower concentrations of SiGMA-PC will tend to concentrate more to the lens surface, rather than in the bulk of the lens.

The methacryloyl groups of the SiGMA-PC monomer provide readily polymerizable constituents to link with other monomer units in the silicone hydrogel polymer containing SiGMA-PC. Accordingly, the SiGMA-PC monomers can be polymerized with a plurality of monomers in silicone hydrogel mixtures.

In some embodiments, the silicone hydrogel polymer includes at least one acrylic acid monomer or ester thereof. Acrylic acid monomers can include, acrylic acid, acrylate, hydroxypropyl acrylate, hydroxybutyl acrylate, 2-(4-Benzoyl-3-hydroxyphenoxy)ethyl acrylate (BHPEA), acrylate salt(s), or the like. The at least one acrylic acid monomer (or derivative thereof) can include methacrylic acid monomers or derivatives thereof such as methacrylic acid or methacrylate salts, glyceryl methacrylate (GMA), (hydroxyethyl) methacrylate (HEMA), hydroxypropyl methacrylate, hydroxybutyl methacrylate, methyl methacrylate (MMA), or any other methacrylic acid or derivative thereof. In examples, the acrylate or methacrylate salts can be a salt of any of the acrylate or methacrylate monomers (or derivatives thereof) disclosed herein. Acrylate or methacrylate salts can include calcium acrylate, lithium methacrylate, sodium methacrylate, potassium methacrylate, calcium methacrylate, or any other suitable acrylate or methacrylate salt(s). Preferably the acrylate or methacrylate salt will be an alkali metal salt such as lithium, sodium or potassium (meth)acrylate.

In further embodiments, the silicone hydrogel polymer can include acrylamide-based monomers such as acrylamide, N,N-dimethylacrylamide (NNDMA), N,N-diethylacrylamide (NNDEA), N,N-diisopropylacrylamide (NNDIPA), N,N-dimethylacetamide, N-vinylpyrrolidinone (NVP) etc.

The at least one methacrylic acid monomer can include a plurality of methacrylic acid monomers, or derivatives thereof. For example, the at least one methacrylic acid monomer (or derivatives thereof) in the silicone hydrogel polymer or monomer mixture can include GMA, HEMA, MAA, sodium methacrylate (NaMA), and any other suitable methacrylic acid monomers or derivatives thereof. The acrylate and methacrylate groups of the acrylate monomers and derivatives thereof provide polymerizable groups for building chains in silicone hydrogel polymers disclosed herein.

Again not wishing to be bound by theory, it is believed that the use of a combination of, for example, methacrylic acid (MAA) and its sodium salt (NaMA) can be used to control the distribution of methacrylic acid moieties along the polymer chain. The un-neutralized methacrylic acid monomer molecules can undergo hydrogen bonding to produce dimeric structures. When incorporated into a growing polymer chain, this tendency to form hydrogen-bonded structures may lead to a degree of blockiness with respect the methacrylic acid units. On the other hand, the neutralized version of methacrylic acid (sodium methacrylate) will place a negatively charged methacrylate moiety on the end of the growing polymer chain, which will tend to electrostatically repel other sodium methacrylate monomer units, leading to the formation of a significantly lower degree of blockiness in the polymer chain. A combination of MAA and NaMA may therefore serve to control the distribution of methacrylic acid functionality in the polymer chain.

The relative concentration of the various acrylate monomers or derivatives thereof (e.g., methacrylic acid monomers or derivates thereof such as methacrylates) can vary from embodiment to embodiment depending on the desired properties (e.g., wettability, light transmittance, Young's modulus, oxygen transmissibility, etc.) of the polymer body of the contact lens. For example, GMA can be at least about 10 wt % of the silicone hydrogel polymer or mixture thereof (e.g., liquid precursor to the cured polymer), such as about 10 wt % to 50 wt %, about 10 wt % to 20 wt %, about 20 wt % to 30 wt %, about 30 wt % to 40 wt %, about 40 wt % to 50 wt %, about 10 wt % to 30 wt %, about 25 wt % to 45 wt %, less than about 50 wt %, or less than about 40 wt % of the silicone hydrogel polymer.

In some embodiments, HEMA can be at least about 20 wt % of the silicone hydrogel polymer or mixture thereof, such as about 20 wt % to 80 wt %, about 20 wt % to 40 wt %, about 40 wt % to 60 wt %, about 60 wt % to 80 wt %, about 20 wt % to 50 wt %, about 50 wt % to 80 wt %, about 25 wt % to 45 wt %, about 45 wt % to 65 wt %, less than about 80 wt %, or less than about 65 wt % of the silicone hydrogel polymer.

In some embodiments, MAA or methacrylic acid can be at least about 0.1 wt % of the silicone hydrogel polymer or mixture thereof, such as about 0.1 wt % to 5 wt %, about 0.1 wt % to 1.5 wt %, about 1.5 wt % to 3.0 wt %, about 3.0 wt % to 5.0 wt %, about 0.1 wt % to 2.5 wt %, about 2.5 wt % to 5.0 wt %, less than about 5.0 wt %, less than bout 3.0 wt %, or less than about 1.5 wt % of the silicone hydrogel polymer.

The monomer mixture used to form the silicone hydrogel polymer can contain small quantities of a cross-linking monomer that is a multifunctional monomer containing two or more polymerizable moieties. Examples of such cross-linking monomer can include, but not limited to ethylene glycol dimethacrylate (EGDMA), triethyleneglycol dimethacrylate (TEGDMA), divinylbenzene (DVB), Trimethylolpropane trimethacrylate (TMPTMA), Allyl methacrylate (AMA). Preferably the cross-linking monomer will be EDGMA.

In some embodiments, EGDMA can be at least about 0.3 wt % of the silicone hydrogel polymer or mixture thereof, such as about 0.3 wt % to 1.5 wt %, about 0.3 wt % to 0.6 wt %, about 0.6 wt % to 0.9 wt %, about 0.9 wt % to 1.2 wt %, about 1.2 wt % to 1.5 wt %, about 0.3 wt % to 0.8 wt %, about 0.8 wt % to 1.5 wt %, less than about 1.5 wt %, or less than about 1 wt % of the silicone hydrogel polymer.

In embodiments, the BHPEA can be at least about 0.2 wt % of the silicone hydrogel polymer or mixture thereof, such as about 0.2 wt % to 1.5 wt %, about 0.2 wt % to 0.5 wt %, about 0.5 wt % to 1.0 wt %, about 1.0 wt % to 1.5 wt %, about 0.2 wt % to 0.7 wt %, about 0.7 wt % to 1.5 wt %, about 0.3 wt % to 0.6 wt %, less than about 1.5 wt %, less than about 1.0 wt %, or less than about 0.7 wt %. The BHPEA can act as a blocking agent to block at least some wavelengths of light (e.g., wavelengths below about 360 nm). While BHPEA is mentioned, other blocking agents suitable for blocking different wavelengths of light can be included in the silicone hydrogel contact lens either additionally or alternatively to BHPEA. For example, titanium dioxide, oxybenzone, octyl salicylate, octocrylene, octyl methoxycinnamate, RUVA-93, thermoplastic olefins, dyes such as yellow dye #15, benzotriazole based agents such as 2-[3-(2H-Benzotriazol-2-yl)-4-hydroxyphenyl]ethyl methacrylate, other blocking agents, or combinations of any of the foregoing can be used. Such blocking agents can be present in a silicone containing hydrogel contact lens or mixture thereof in the amounts disclosed above for BHPEA, either alone or cumulatively.

In embodiments, the acrylate or methacrylate salt such as sodium methacrylate can be at least about 0.1 wt % of the silicone hydrogel polymer or mixture thereof, such as about 0.1 wt % to about 5 wt % of the hydrogel polymer about 0.1 wt % to 1.5 wt %, about 1.5 wt % to 3.0 wt %, about 3.0 wt % to 5.0 wt %, about 0.1 wt % to 2.5 wt %, about 2.5 wt % to about 5.0 wt %, less than about 5.0 wt %, less than bout 3.0 wt %, or less than about 1.5 wt % of the silicone hydrogel polymer.

The silicone hydrogel polymer, or the monomer mixture thereof, can include further components, such as, at least one ether. The one or more ethers can be formulated to act as photo initiators of radical polymerizations. For example, the one or more ethers can be selected to initiate polymerization upon exposure to selected wavelengths of light (e.g., UV light). The one or more ethers can include benzoin methyl ether, 4-acryloyloxybenzoin methyl ether (ABME), a-methylolbenzoin methyl ether acrylate (MBA), or equivalent ether-containing photoinitiators for radical polymerization of ethene groups in the acrylate and methacrylate containing monomer units of the silicone hydrogel polymers disclosed herein. In some embodiments, the at least one ether can be at least about 0.3 wt % of the silicone hydrogel polymer, or the monomer mixture thereof, such as about 0.3 wt % to 1.5 wt %, about 0.3 wt % to 0.6 wt %, about 0.6 wt % to 0.9 wt %, about 0.9 wt % to 1.2 wt %, about 1.2 wt % to 1.5 wt %, about 0.3 wt % to about 0.7 wt %, about 0.7 wt % to 1.5 wt %, less than about 1.5 wt %, or less than about 1 wt % of the silicone hydrogel polymer.

In some embodiments, diphenyl(2,4,6-trimethylbenzoyl) phosphine oxide (TPO) can be present in the silicone hydrogel polymer as a photo initiator for radical reactions. For example, the TPO can be at least about 0.1 wt % of the silicone hydrogel polymer, such as about 0.1 wt % to 1.5 wt %, about 0.1 wt % to 0.5 wt %, about 0.5 wt % to 1.0 wt %, about 1.0 wt % to 1.5 wt %, less than about 1.5 wt %, or less than about 1.0 wt % of the silicone hydrogel polymer.

In some embodiments, the silicone hydrogel polymer can be formed from a monomer mixture that includes at least one poloxamer. Suitable poloxamers can include Poloxamer 124 (Pluronic L-44; aver. M. W. 2,200), Poloxamer 188 (Pluronic F-68; aver. M. W. 8,350), Poloxamer 235 (Pluronic P-85; aver. M. W. 4,600) and Poloxamer 407 (Pluronic F-127; aver. M. W. 11,500). Preferably, Poloxamers 188, 235 and 407 are used, and most particularly, Poloxamer 407. The at least one Poloxamer can be at least about 0.1 wt % of the monomer mixture used to form the silicone hydrogel polymer, such as about 0.1 wt % to 1.5 wt %, about 0.1 wt % to 0.5 wt %, about 0.5 wt % to 1.0 wt %, about 1.0 wt % to 1.5 wt %, less than about 1.5 wt %, or less than about 1.0 wt % of the silicone hydrogel monomer mixture.

In some embodiments, at least one pyrrolidone, such as N-methyl-3-methylene-2-pyrrolidone (N-MMP), can be present in the silicone hydrogel polymer or mixture thereof. For example, the at least one pyrrolidone can be at least about 5 wt % of the silicone hydrogel polymer or mixture thereof, such as about 5 wt % to 20 wt %, about 5 wt % to 10 wt %, about 10 wt % to 15 wt %, about 15 wt % to 20 wt %, less than about 20 wt %, or less than about 15 wt % of the silicone hydrogel polymer.

In other embodiments, at least one acrylamide derivative, such as N,N-dimethylacrylamide, or N-vinyl pyrrolidinone can be present in the silicone hydrogel polymer. For example, the at least one acrylamide can be at least about 5 wt % of the silicone hydrogel polymer or mixture thereof, such as about 5 wt % to 20 wt %, about 5 wt % to 10 wt %, about 10 wt % to 15 wt %, about 15 wt % to 20 wt %, less than about 20 wt %, or less than about 15 wt % of the silicone hydrogel polymer.

In some embodiments, the monomer mixture used to form the silicone hydrogel polymer can include any number of possible diluents including, but in no way limited to, propylene glycol (PG), glycerine, diethylene glycol, triethylene glycol, Dowanol PM, Dowanol DPM, ethyl lactate, solketal, polyethylene glycol, butoxyethanol, hexylene glycol, or other similar diluents. Typically, only a trace residual amount of the diluent, if any, will be found in the final lens. In examples, the diluent can be at least about 10 wt % of the silicone hydrogel monomer mixture, such as about 10 wt % to 25 wt %, about 10 wt % to 15 wt %, about 15 wt % to 20 wt %, about 20 wt % to 25 wt %, less than about 25 wt %, or less than about 20 wt % of the silicone hydrogel monomer mixture.

In some embodiments, a dye can be present in the monomer mixture used to form the silicone hydrogel polymer, such as Reactive Blue 19 (RB-19) or the like. The dye can be about less than about 1 wt % of the silicone hydrogel polymer such as about 0.001 wt % to 0.1 wt %, about 0.005 wt % to 0.01 wt %, or more than about 0.001 wt % of the silicone hydrogel monomer mixture. Such relatively low concentrations of dye can be perceptible from a distance (e.g., when in a contact lens case or counter top) but not perceptible when a contact lens formed from the silicone hydrogel polymers (containing SiGMA-PC throughout) is worn. Ideally, the dye should contain a polymerizable group (for example Reactive Blue 247), or some other reactive moiety that allows the dye to become covalently attached to the silicone hydrogel polymer either during polymerization or in some post polymerization process such as lens hydration (for example Reactive Blue 4 or Reactive Blue 19). Suitable dyes for use ideally will be those listed in 21 CFR 73 and/or 21 CFR 74.

In some embodiments, the plurality of monomers in the silicone hydrogel polymer includes SiGMA-PC monomers, and at least one of glyceryl methacrylate, 2-hydroxyethyl methacrylate, sodium methacrylate, 2-(4-Benzoyl-3-hydroxyphenoxy)ethyl acrylate, methacrylic acid, ethylene glycol dimethacrylate. Also included in the monomer mixture can be inert components such as at least one poloxamer, propylene glycol, or a combination of any of the foregoing. In such embodiments, the SiGMA-PC monomer can be about 0.1 to about 15 weight percent (wt %) of the silicone hydrogel polymer, glyceryl methacrylate can be about 10 wt % to about 50 wt % of the silicone hydrogel polymer, the 2-hydroxyethyl methacrylate can be about 20 wt % to about 80 wt % of the silicone hydrogel polymer, the sodium methacrylate can be about 0.1 wt % to about 5 wt % of the silicone hydrogel polymer, the 2-(4-Benzoyl-3-hydroxyphenoxy)ethyl acrylate can be about 0.2 wt % to about 1.5 wt % of the silicone hydrogel polymer, the methacrylic acid can be about 0.1 wt % to about 5 wt % of the silicone hydrogel polymer, the ethylene glycol dimethacrylate can be about 0.3 wt % to about 1.5 wt % of the silicone hydrogel polymer of the silicone hydrogel polymer.

Any combination of above-noted monomer units can be polymerized to form the silicone hydrogel polymer containing SiGMA-PC distributed therethrough (e.g., having a minimum concentration of SiGMA-PC throughout the entire volume of the resulting polymer). At least some of the monomers of the (liquid) silicone-hydrogel polymer mixture can be solubilized in at least some of the other monomers of the mixture. At least some of the monomers in the silicone hydrogel polymer mixture can be polymerized (e.g., copolymerized) via radical reactions, such as between the acrylate groups in the respective monomers. Such polymerization can be photo-initiated, heat initiated, catalytically initiated, or combinations thereof. The polymerization of the silicone hydrogel polymer mixture can serve to cure and harden the silicone hydrogel mixture into an at least partially solid silicone-hydrogel polymer containing SiGMA-PC distributed therethrough in at least a minimum concentration throughout the entire volume of the polymer. The resulting silicone hydrogel polymer can be pliable and resilient.

Polymerization of silicone hydrogel monomer mixture is preferentially photo-initiated. The silicone hydrogel polymer can be formed of randomly ordered units of monomers including at least any monomer component or derivative thereof disclosed herein.

The use of a combination of methacrylic acid (MAA) and an alkali metal salt of methacrylic acid (e.g. its sodium salt, NaMA) may modify the distribution of methacrylic acid moieties in the polymer chain by virtue of the electrostatic repulsion provided by the ionized monomer NaMA. The incorporation of for example acrylamide based monomers into the silicone hydrogel monomer mix may also lead to a high degree of blockiness in the polymer structure by virtue of the large difference in monomer reactivity ratios between the acrylamide and methacrylate based monomers. Other monomer mixtures with large differences in monomer reactivity ratios (for example between acrylate and methacrylate based monomers) can also lead to a blocky structure. Such behavior can be deduced using the Copolymer Equation (also known as the Mayo Lewis equation).

The silicone hydrogel polymers disclosed herein (containing SiGMA-PC monomers dispersed therethrough) provide a number of desirable characteristics and properties compared to silicone hydrogel polymers that do not contain SiGMA-PC monomers therethrough. For example, the silicone hydrogel polymers disclosed herein can provide a comfortable polymer having an oxygen transmissibly value (Dk) of at least 20, desirable relaxation rate and dynamic friction values, and can, in some instances, provide a high wettability and water retention at the surface (e.g., front surface) of a contact lens, all while allowing at least 80% of violet light to pass through the contact lens.

Figure 2:
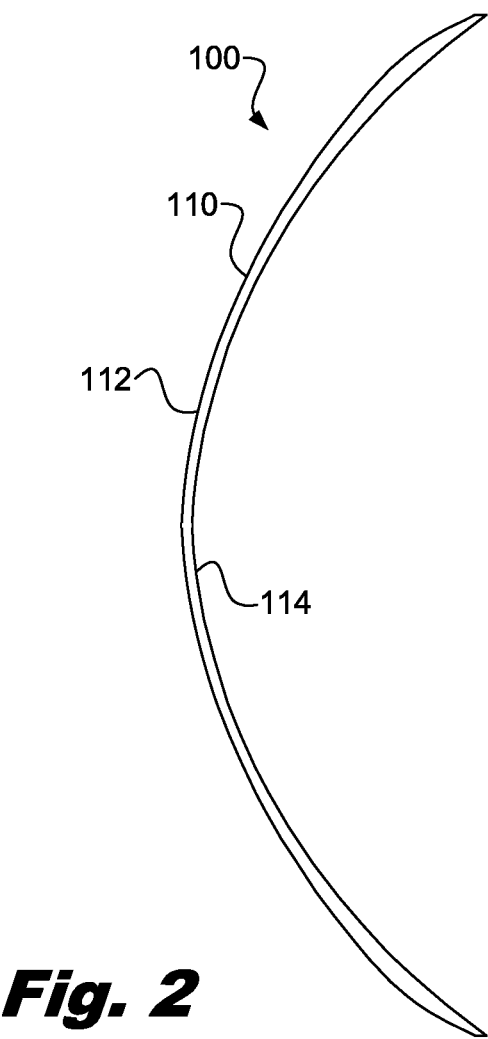
FIG. 2 is cross-sectional view of one embodiment of a contact lens, according to the principles of the present disclosure.

FIG. 2 depicts an example of the ophthalmic lens 100. The ophthalmic lens 100 includes a body 110 of the silicone hydrogel polymer containing SiGMA-PC disclosed herein. For example, the body 110 can include silicone hydrogel polymer including a plurality of monomers, the plurality of monomers including at least some SiGMA-PC monomer units distributed throughout the body 110. The SiGMA-PC monomer units are present in a minimum concentration throughout the entirety of the body 110. The minimum concentration of SiGMA-PC can be at least about 0.1 wt %, 1 wt %, 1.5 wt %, 2 wt %, or 2.5 wt % of any given volume of the body 110. The shape of the body 110 defines a front surface 112 that faces away from the wearer and a back surface 114 that contacts the eye of the wearer. As noted above, the concentration of PC substituent groups and/or SiGMA-PC monomer units can be higher at the front surface 112 than the back surface 114 and/or a point between the front surface 112 and the back surface 114. In some embodiments, the body can exhibit a gradient of increasing SiGMA- PC concentration from the back surface 114 to the front surface 112, where a high concentration of the hydrophilic PC groups is desired.

When formed under selected conditions, the silicone hydrogel polymer contact lenses 100 disclosed herein can have a greater amount (e.g., larger concentration) of SiGMA-PC monomer units at the front surface 112 than the back surface 114. Accordingly, the body of the contact lenses disclosed herein can have a greater amount of SiGMA-PC (or PC substituents) at the front surface than at the back surface and/or a larger concentration of SiGMA-PC at the front surface than in a portion of the body between the front surface and the back surface. In such embodiments, the front surface of the contact lenses disclosed herein can, in some instances, exhibit higher water retention and wettability than the back surface of the lens or the interior of the lens. Such preferential water retention and wettability provide a more comfortable front surface due to the presence of more lubrication in the form of water, which reduces friction with the eyelid of a wearer. This lubricating effect is provided at the front surface, while the relatively lower concentration of SiGMA-PC at the back surface provides relatively less wettability and water retention which prevents the lens from slipping or otherwise moving out of position on a wearer's eye. Further, the relatively high oxygen transmissibility (at least 25 Dk) in the contact lenses disclosed herein allows a wearer to use the lens longer without experiencing discomfort or ocular damage such as corneal hypoxia. The SiGMA-PC monomer units dispersed throughout the body of the contact lens ensure that the lens does not dry out as quickly as conventional silicone hydrogel contact lenses.

The water content of the silicone hydrogel polymers disclosed herein, after hydration with water, can be higher than the water content of conventional silicone hydrogel lenses. For example, the water content of the silicone hydrogel lenses disclosed herein, after hydration with water, can be equivalent to at least about 35 wt % or more of the total weight of the silicone hydrogel polymer, such as about 20% to about 80%. The water content of the silicone hydrogel lenses disclosed herein, after hydration with water, can, in some instances, be higher at the front surface 112 than the back surface 114 and/or a point therebetween. For example, the ophthalmic lens 100 can exhibit a gradient of water content that increases from the back surface 114 to the front surface 112. In such examples, the presence of relatively more PC groups from the higher concentration of the SiGMA-PC at the front surface 112 can enhance the water content at the front surface 112 by at least 40% higher than at the back surface 114. During formation, HEMA can be preferentially present in higher concentrations nearest the back surface, GMA can be preferentially present in higher concentrations nearest the interior of the ophthalmic lens 100 (e.g., at a point between the front surface 112 and back surface 114), and SiGMA-PC can be preferentially present in higher concentrations near the front surface 112. HEMA can retain two molecules of water per HEMA unit, GMA can retain 10 molecules of water per GMA unit, and PC of the SiGMA-PC monomer can retain 19 molecules of water per PC unit. Accordingly, the formation of the silicone hydrogel polymer contact lenses disclosed herein can result in a gradient of water retention in the ophthalmic lens 100. The wettability of SiGMA-PC is extremely high as well. Accordingly, the front surface 112 can, in some instances, be extremely wettable and retain the water to provide a more comfortable feel to a wearer.

Often, increases in water retention and wettability result in lower oxygen transmissibility. However, the inventors have surprisingly found that despite the increased water retention of the silicone hydrogel polymers disclosed herein, contact lenses formed with the silicone hydrogel polymers (containing SiGMA-PC therethrough) have greatly increased the oxygen transmissibility values of similarly formulated silicone hydrogel polymers without the SiGMA-PC present therethrough. In some embodiments, oxygen permeability of an ophthalmic lens can range from a Dk value of 15 to 100, inclusive, or about Dk20 to 80, inclusive, or about 25 to 40, inclusive. Oxygen permeability lower than Dk15 is not desirable for a contact lens because the low oxygen permeability can result in an increased load on the cornea, making extended wearing of the lens difficult.

The strength of the ophthalmic lens 100 is also not sacrificed by the presence of the SiGMA-PC monomers in the silicone hydrogel polymers disclosed herein. Rather, the silicone hydrogel polymers containing SiGMA-PC therethrough described herein exhibit a Young's modulus of at least about 0.1 MPa, such as about 0.1 MPa to about 0.6 MPa, about 0.1 MPa to about 0.3 MPa, about 0.2 MPa to about 0.4 MPa, about 0.3 MPa to about 0.5 MPa, about 0.4 MPa to about 0.6 MPa, greater than about 0.2 MPa, greater than about 0.3 MPa, greater than about 0.4 MPa, or greater than about 0.6 MPa. Accordingly, the contact lenses containing the silicone hydrogel polymers disclosed herein are relatively strong and resilient compared to conventional silicone hydrogel polymers.

In some embodiments, the ophthalmic lens 100 exhibits a desirable flexibility. The ophthalmic lens can exhibit a Young's modulus of about 0.10 MPa to 1.00 MPa, inclusive. And more preferably about 0.10 MPa to 0.80 MPa, inclusive, still more preferably 0.10 MPa to 0.50 MPa, inclusive. When the Young's modulus of elasticity of the ophthalmic lens is below the aforementioned lower value, restorability of the ophthalmic lens may be lost, and shape retention of the lens during manipulation on hands/fingers can be deteriorated when used for the ophthalmic lens, reducing the handle-ability of the lens. In contrast, when the Young's modulus of elasticity of the ophthalmic lens is beyond the aforementioned upper limit, the ophthalmic lens becomes so hard that the comfort exhibited when wearing the ophthalmic lens is compromised.

In some exemplary embodiments, the ophthalmic lens 100 exhibits a relaxation rate (30 sec) of about 1.0% to 5.5%, inclusive. And more preferably about 1.2% to 4.5%, inclusive, still more preferably 1.5% to 4.0%, inclusive. Relaxation rate (30 sec) over 5.5% is undesirable as it is indicative of potential poor shape recovery for the lens, if the lens is compressed or otherwise distorted during packaging or long-term storage. Poor shape recovery in an ophthalmic lens can result in optical distortion.

Similarly, in some embodiments, the ophthalmic lens 100 exhibits a dynamic friction (20-30 mm(mN)) of about 20 mN to 50 mN, inclusive. And more preferably about 20 mN to 45 mN, inclusive, still more preferably 20 mN to 45 mN, inclusive. Materials that exhibit a dynamic friction (20-30 mm(mN)) over 50 mN is indicative of a material that will have a relatively high degree of friction between lens and eyelid, often resulting in discomfort to the user.

In accordance with the properties and characteristics noted above, contact lenses containing the silicone hydrogel polymers having SiGMA-PC disclosed herein surprisingly exhibit a number of desirable properties not thought to be possible in a single composition. For example, the contact lenses herein can exhibit an oxygen transmissibility value (Dk) greater than 25 or greater than 35, a Young's modulus of about 0.1 MPa to about 0.6 MPa or greater than 0.2 MPa, can hold a water content of about 20% to about 80% of a total weight of the hydrogel polymer.

FIG. 3 illustrates a flow diagram of a method 400 for making a contact lens, in accordance with the principles described herein. The method 400 includes block 410 of applying a liquid lens material into a spin casting mold and block 420 of spinning the spin casting mold, where the liquid lens material includes a plurality of monomers, the plurality of monomers including at least some 3,5,8,13-tetraoxa-4-phospha-12,14-disilapentadecan-1-aminium,4-hydroxy-N,N,N,12,14,14-hexamethyl-6-[[(2-methyl-1-oxo-2-propen-1-yl)oxy]methyl]-12-[(trimethylsilyl)oxy]-, inner salt, 4-oxide ("SiGMA-PC") monomer units. Further acts are contemplated and described below.

At block 410, applying or disclosing a liquid lens material into a spin casting mold can include applying any of the silicone hydrogel polymers compositions containing SiGMA-PC disclosed herein into the mold. The liquid lens material can include one or more of solvent(s), SiGMA-PC, at least one acrylate monomer, at least one methacrylate monomer (e.g., MAA, MA, GMA, HEMA, etc.), at least one ether, at least one poloxamer, a diluent, at least one blocking agent (e.g., BHPEA), or derivatives of any of the foregoing. Suitable components for the liquid lens material are described above with respect to the silicone hydrogel polymer and can include any combination of the components described herein in any combination of concentrations described herein. For example, the liquid lens material (e.g., silicone hydrogel polymer mixture) can include SiGMA-PC and at least one of GMA, HEMA, sodium methacrylate, BHPEA, MAA, N-MMP, NNDMA, NVP, NNDEA, NNIPA, at least one cross-linking monomer such as EGDMA, at least one photoinitiator such as BME or TPO, at least one inert component and/or glycol diluent, or a combination of any of the foregoing.

The liquid lens material can exhibit a substantially homogenous distribution of monomer species therein, such as prior to spinning the mold. The block 410 of applying the liquid lens material into the mold can be preceded by or be carried out substantially contemporaneously with mixing the liquid lens material to achieve a substantially homogenous distribution of monomer components throughout the volume of the liquid lens material. Such mixing can be performed with a mechanical mixer such as a paddle mixer, blade mixer, or other mixing apparatus.

The liquid lens material can be aliquotted (e.g., injected) into the mold to provide enough liquid lens material to form a single contact lens. The liquid lens material can be positioned in a central portion of a mold cavity, such that when spun, the liquid lens material is thrown outward form the central portion by centrifugal force at a selected rate to form the contact lens. The amount of force can be controlled by the spin rate of the mold. The amount of lens material in the mold, the type of lens material (and properties thereof such as viscosity), the spin rate of the mold, etc. can influence the thickness or other dimensions of the resulting contact lens. In some examples, further shaping can be carried out by performing processes on the contact lens, either during or post cure, such as with a blade or laser. Prior to dosing of the liquid lens material, the mold may be treated, such as by a plasma treatment. Additionally, the mold can be tilted or otherwise manipulated to facilitate formation of the lens.

The block 420 of spinning the spin casting mold can include spinning the spin casting mold at a rotation rate sufficient to form a contact lens (e.g., form a complete dome shape) front surface from the liquid lens material in the mold. One or more spin casting molds can be positioned in a spinning structure. Spinning the spin casting mold can include spinning the spin casting mold in the spinning structure, such as with a plurality of spinning molds in the spinning structure. Spinning the spin casting mold can include spinning the spin casting mold axially (e.g., about a center point of the shape of the front surface). In some embodiments, spinning the spin casting mold can include spinning the spin casting mold radially (e.g., such that the shape of the front surface rotates radially about a fixed point spaced therefrom).

As explained in more detail below, the mold can be shaped to form a contact lens. The shape of the surface of the mold can correspond to the desired front surface of the contact lens (e.g., convex shape) or the back surface of the contact lens (e.g., concave shape), in the case of a cast molded lens. Normally, the bottom of the mold (in a spin casting mold) is a concave shape corresponding to the front surface of the resulting contact lens formed therein. The method 400 can include at least partially curing the liquid lens material via spin casting to form the contact lens. In embodiments, the liquid lens material can be at least partially cured in the mold, such as by utilizing a curing agent while spinning the mold. Curing can include polymerizing and/or cross-linking at least some of the monomers in the silicon hydrogel polymer mixture. While the current process is primarily disclosed with regard to a spin casting process, the present material can be used and manufactured in any number of contact lens forming processes, including, but in no way limited to, spin casting, cast molding, and lathing. In some examples, a hybrid process including spin casting followed by lathing can be performed to provide mechanisms to enable enhancement of the SiGMA-PC at the polymer-mold interface, as generally taught in U.S. Pat. No. 4,555,372, which patent is incorporated herein by reference for all that it discloses.

FIGS. 5-8 illustrate various components that can be used in certain examples for making a contact lens, in accordance with the principles described in the present disclosure. A liquid lens material 52 can be applied to a profile 54 of the mold 42. The mold 42 with the liquid lens material 52 can be loaded into a spinning structure 68 that is configured to spin the mold 42 so that the liquid lens material 52 centrifugally spreads across the profile 54 into the desired shape of the contact lens. A curing agent (e.g., temperature, actinic radiation, or another type of curing agent) is exposed to the liquid lens material 52 while the mold 42 is spinning. As a result, the liquid lens material 52 hardens into the ophthalmic lens 100 (FIGS. 1-3). The cured lens can then be removed, hydrated, packaged, sterilized, and shipped, in various orders.

Figure 4:
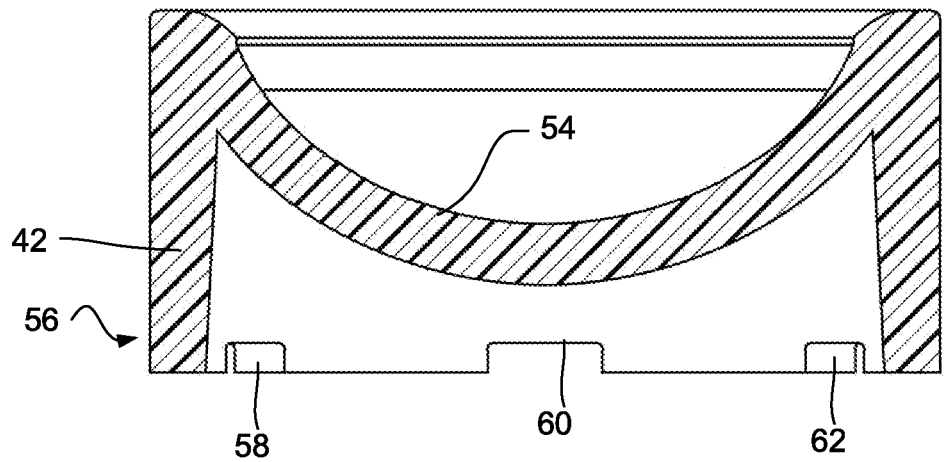
FIG. 4 is a cross-sectional view of one embodiment of a mold for an ocular lens, according to the principles of the present disclosure.

FIG. 4 is a cross-sectional view of one embodiment of a mold for a contact lens according to the principles of the present disclosure. In this example, the mold 42 has a base 56 with multiple cut outs 58, 60, 62 that are spaced and shaped to interlock with an internal surface of a spinning structure during a later stage of manufacturing. The profile 54 of the mold 42 is shaped to form the anterior or front surface of the contact lens.

Figure 5:
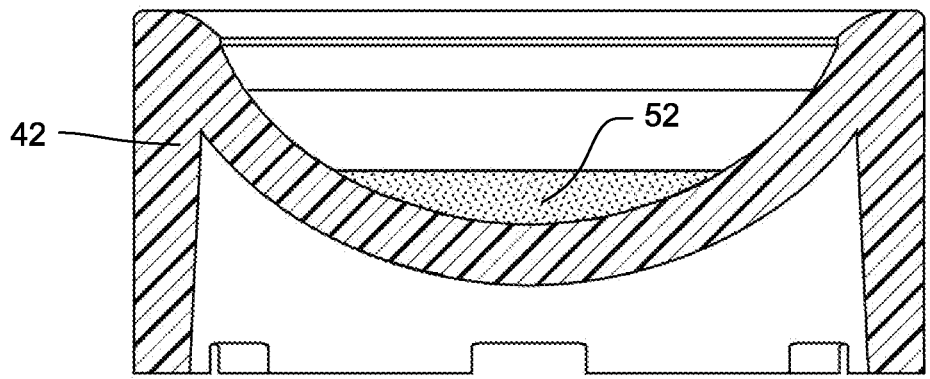
FIG. 5 is a cross-sectional view of one embodiment of a mold with a liquid lens material, according to the principles of the present disclosure.

FIG. 5 is a cross-sectional view of one embodiment of a mold 42 with a liquid lens material 52 according to the principles of the present disclosure. In this example, the liquid lens material 52 is deposited into the profile 54 of the mold.

The contact lens can be shaped and sized based on a variety of factors, including the shape and size of the user's eye and various optical properties to be achieved by a central portion of the contact lens. In some examples, the total thickness of the contact lens can be at least 0.06 mm such as about 0.1 mm to about 0.14 mm. The thickness of the contact lens can gradually vary at different locations on the contact lens. For example, the contact lens can be thicker near the outer edge of the contact lens than in the central portion of the contact lens. The thickness can be selectively controlled by the amount of liquid lens material in the mold, the type of lens material (and properties thereof such as viscosity), the spin rate of the mold, etc. Additionally, any number of features can be formed on the lens.

Figure 6:
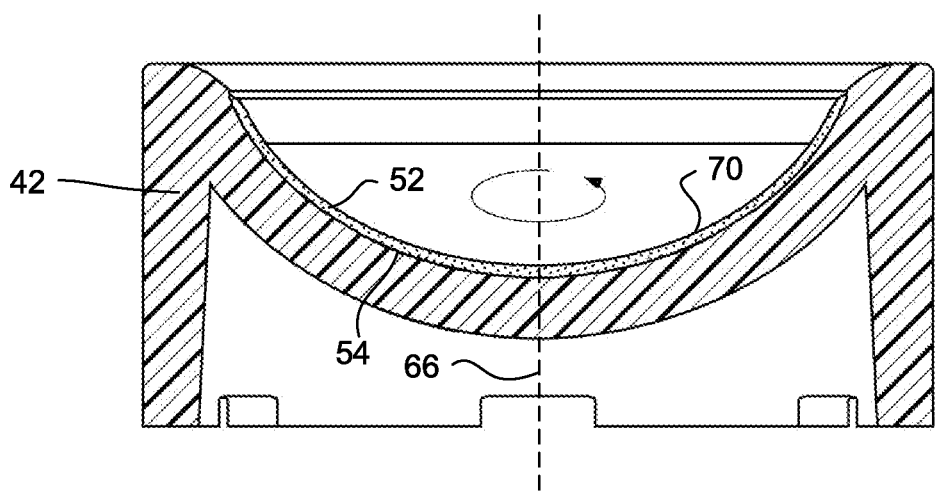
FIG. 6 is a cross-sectional view of one embodiment of a mold with a liquid lens material centrifugally spreading across a profile of the mold, according to the principles of the present disclosure.
Figure 7:
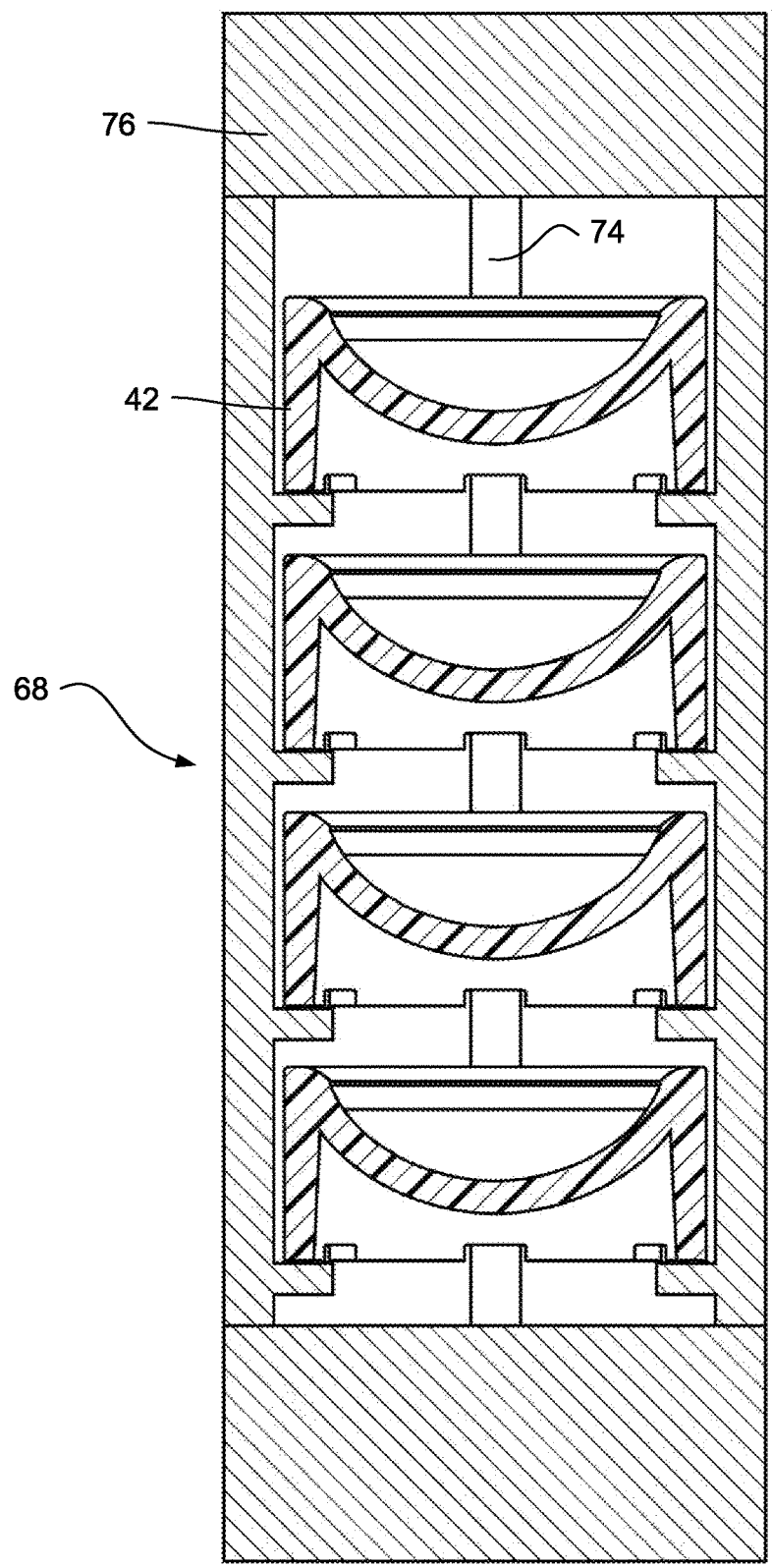
FIG. 7 is a cross-sectional view of one embodiment of a spinning structure used to hold and spin molds for making ocular lenses, according to the principles of the present disclosure.

FIGS. 6 and 7 are cross-sectional views of a mold 42 with a liquid lens material 52 centrifugally spreading across a profile 54 of the mold 42, according to the principles of the present disclosure. In this example, the mold 42 is spun around a central axis 66 within a spinning structure (68, FIG. 6). The spinning structure 68 is rotated at a speed and in such a way that forms the desired posterior surface 70 of the contact lens.

Figure 8:
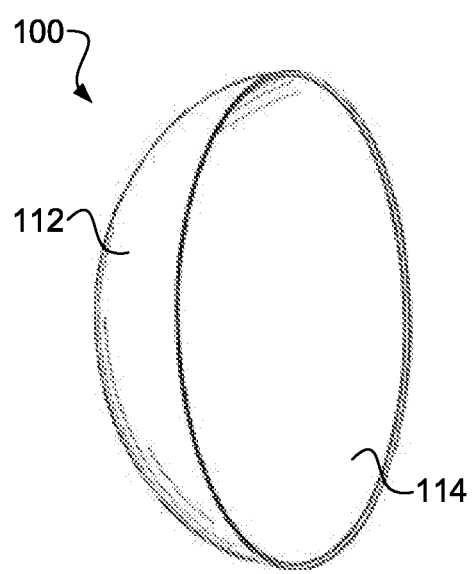
FIG. 8 is an isometric view of one embodiment of a contact lens, according to the principles of the present disclosure.

The spinning structure 68 includes a central loading region that can receive the molds 42 that contain the liquid lens material 52. The central loading region can be formed by a glass tube, a metal tube, or another type of structure that can retain the molds 42 in a stacked orientation. In examples where actinic radiation is used as the curing agent, the spinning structure 68 can have an opaque material, a semi-transparent material, or a transparent material that include sufficient openings to allow the actinic radiation into the central loading region. In the example of FIG. 8, the spinning structure 68 includes multiple guide posts 74 that retain the molds 42 in a stacked orientation. The spinning structure 68 also includes a region 76 that can be used to attach the spinning structure 68 to a spinning driver, such as a motor.

The spinning structure 68 is programmed to rotate in a precise manner to form the desired posterior surface 70 of the contact lens, which is the surface of the contact lens that is intended to contact the eye. The program that causes the spinning structure 68 to rotate can be modified to create a desired profile for different users, effects, conditions, and the like. The curing agent is applied to the liquid lens material 52 while the spinning structure 68 rotates the molds 42. As a result, the contact lens is formed while the spinning structure rotates. In some examples, the contact lenses can be fully cured within the spinning structure. In other examples, the contact lens can be fully cured over the course of multiple curing stages. For example, the contact lens can be cured in the spinning structure 68 to a point where the liquid lens material retains its shape, but is not fully cured. At this stage, the mold with the contact lens can be removed from the spinning structure to finish curing in an environment that is cost effective. A spinning structure that is compatible with the principles described herein is described in U.S. Patent Publication 2012/0133064 issued to Stephen D. Newman. U.S. Patent Publication 2012/0133064 is herein incorporated by reference for all that is disclosed.

While shown as only providing a mold surface for the front surface, in some embodiments, an additional mold part can be provided that supplies the shape of back surface of a contact lens, such as in a cast molding system. Such mold pieces can be clamped together to form contact lenses by applying pressure from both sides to force the liquid lens material therebetween outward to fill the mold cavity and form the shape of the contact lens. The liquid lens solution can be cured in the mold, such as via exposure to a selected wavelength of light (e.g., UV light). Any flashing from the molding process can be trimmed after the contact lens is cured, or as a function of combining the two portions of the mold together.

The concentration of SiGMA-PC near the front surface of the resulting contact lens can be selectively controlled (e.g., increased or decreased) by controlling the energy domains of the materials in contact with the liquid lens material during formation of the contact lens. For example, referring back to FIG. 3, the material that forms the profile 54 in the mold 42 can have a first surface energy (herein after referred to as an energy domain) and the material that contacts the resulting back surface of the contact lens material during manufacture can have a second energy domain that is different than the first energy domain.

For example, the first energy domain can be defined by the material in the mold that forms the profile 54, which as a solid would have a lower energy value than the a gas which would form the second energy domain in the molds illustrated in FIGS. 5-8, which gas would provide a higher energy value than the first energy domain. The substituents preferentially arrange toward the lower energy domain and therefore have a higher concentration nearest the profile 54 in the mold, resulting in a front surface having a higher concentration of SiGMA-PC monomer units relative to the back surface or a point between the back surface and the front surface. Further, manipulation of energy domains of molding surfaces can be achieved by pretreating the surface at profile 54 prior to applying the liquid lens material thereto, such as by plasma treatment. Manipulation of the energy domains in the mold surfaces can include utilizing an additional mold portion (not shown) that provides a profile of the back surface of the contact lens. In these embodiments, the mold materials for the front and back surfaces can be identical or differ from each other to selectively control the energy domains thereof, and to provide a selected concentration of SiGMA-PC at the respective surfaces of the resulting contact lens.

By utilizing a liquid lens material including a substantially homogenous mixture of the silicone hydrogel polymer components that include SiGMA-PC therein, no surface treatment of the resulting contact lens or additional layer(s) is necessary to provide the selected surface properties or light transmission properties disclosed above. Accordingly, the contact lenses disclosed herein can be formed as a single layer. The contact lenses disclosed herein can include only a single layer which provides all of the beneficial properties and characteristics described herein.

Due to the combination of properties and characteristics (high violet light transmittance, high oxygen transmissibility value, high Young's modulus, high water content, low relaxation rate, and relatively low dynamic friction) exhibited by the silicone hydrogel polymers having SiGMA-PC, as described herein, the resulting polymer can be formed and used without surface treatment of the as-molded contact lens. For example, due to the high wettability and water retention ability of the silicone hydrogel polymers provided by the PC groups at or near the front surface of the lenses disclosed herein, the lenses will provided a smooth hydrated feel with the eyelid of a wearer. Thus, no further coatings or treatments are necessary to provide a comfortable contact lens after molding the single layer of silicone hydrogel polymer containing SiGMA-PC distributed therethrough into a contact lens, though additional coatings or treatments can be formed or performed, if desired.

The method 400 can include removing the contact lens from the mold. FIG. 8 depicts an example of the ophthalmic lens 100 in an isometric view. The ophthalmic lens 100 can be selectively formed to prevent and/or treat any number of ocular conditions, such as myopia, hyperopia, astigmatism, macular degeneration, strabismus, etc. For example, the curvature of the back surface 114 can differ from the curvature of the front surface 112 to provide a selected focal point of the light passing therethrough in the eye of the wearer. The ophthalmic lens 100 can be removed from the mold as a fully cured contact lens. In some embodiments, the ophthalmic lens 100 can be removed from the mold as a partially cured contact lens which is allowed to fully cure outside of the mold.

While spin cast molding is disclosed above, further formation techniques are contemplated for making the contact lenses disclosed herein. For example, cast molding, lathe cutting, or even injection molding can be used. Thus, methods of forming the contact lenses disclosed herein can include applying or injecting a liquid lens material into a mold, closing the mold, and applying force to a mold to make the liquid lens material conform to the mold. The force can include mechanical force exerted on mold components, hydraulic force exerted on the liquid lens material, centrifugal force exerted by spinning the mold, or combinations of the foregoing.

While the contact lenses disclosed herein can be formed from a single layer of material, in some embodiments (not shown), at least one additional layer can be applied to the silicone hydrogel polymer containing SiGMA-PC. For example, the liquid lens material can be at least partially cured before a second material is added. The second material can be added to the posterior side (back surface) of the partially cured liquid lens material 52. In some cases, the second material can be spread out to cover the entire posterior side of the liquid lens material, but in other examples, the second material can be spread out across a portion of the posterior side's surface area. The second material can be cured in place while the second material is later dosed and cured. Accordingly, the method 400 can include applying a second material to the first liquid lens material, such as where the second material includes a characteristic of blocking at least some light. For example, the second material can include a blocking agent not included in the liquid lens material (e.g., silicone hydrogel polymer), such as a blocking or filtering agent composed to limit passage of a different wavelength of light than a blocking agent in the silicone hydrogel polymer.

Additional layers of material can be added to control any of the properties of the resulting contact lens.

WORKING EXAMPLES

Working Examples of contact lenses were formed and tested for compositional characteristics on the surfaces thereof. Working Example 1 included SiGMA-PC monomer, methacrylic acid monomers and derivatives thereof (including GMA, HEMA, NaMA, MAA, and EGDMA, where the GMA and HEMA comprised the majority of the methacrylic acid monomers and derivatives thereof), BME, BHPEA, and RB-19. Working Example 1 was formed as a solution and spin cast in a mold to form a contact lens with a front surface and a back surface.

Comparative Example A included a combination of SiGMA monomer and MPC monomer in a combined 8 wt % comparable to the 8 wt % of SiGMA-PC in Working Example 1 above. The remaining additives (methacrylic acid monomers and derivatives thereof including GMA, HEMA, NaMA, MAA, and EGDMA, where the GMA and HEMA comprised the majority of the methacrylic acid monomers and derivatives thereof, BME, and BHPEA) were substantially the same in both Working Example 1 and comparative Example A. In other words, comparative Example A differed from Working Example 1 only in that the PC containing monomers were MPC and SiGMA-PC, respectively, though SiGMA units were present in both samples. The combination of SIGMA and MPC differs from SiGMA-PC by not having the phophorylcholine constituent directly bound to the silicon-containing GMA component as found in SiGMA-PC. Comparative Example A was formed as a solution and spin cast in a mold to form a contact lens with a front surface and a back surface.

Working Example 1 and Comparative Example A were tested for compositional make-up on the surfaces thereof using x-ray photoelectron spectroscopy (XPS). The XPS spectrometer used to test the samples was a K-Alpha™ model (available from THERMO FISCHER SCIENTIFIC INC.). The spectrometer used an Al Kα x-ray source with a spot size of 400 μm and the neutralizing gun turned on. The spectrometer was operated with Ar ion cluster etching, an etching rate of 20 nm/min, and an ion energy of 4 keV. The XPS tests were carried out on the front surface and the back surface of Working Example 1 and the front surface of Comparative Example A.

The XPS analysis of the front surface of Working Example 1 produced the data (Peak binding energy (BE), height in counts per second (CPS), full width at half maximum (FWHM) (eV), area ((P) in (CPS·eV), and atomic percent) shown in Table 1 corresponding to the various components identified in column 1 of Table 1.

TABLE 1

| Component Name | Peak BE | Height (CPS) | FWHM (eV) | Area (CPS · eV) | Atomic % |
|---|---|---|---|---|---|
| Si2p | 101.7 | 4691.5 | 1.8 | 8958.1 | 1.8 |
| P2p | 133.6 | 2196.0 | 1.9 | 4878.6 | 0.7 |
| C1s C—C | 284.8 | 107487.2 | 1.5 | 171478.6 | 35.1 |
| C1s C—O | 286.4 | 68672.8 | 1.4 | 104724.8 | 21.5 |
| C1s COO | 288.8 | 33903.2 | 1.2 | 43410.2 | 8.9 |
| N1s | 402.7 | 2642.1 | 1.1 | 3888.7 | 0.5 |
| O1s | 532.6 | 150100.5 | 2.3 | 369609.0 | 31.3 |

The XPS analysis of the front surface of Comparative Example A produced the data shown in Table 3 corresponding to the various components identified in column 1.

TABLE 2

| Component Name | Peak BE | Height (CPS) | FWHM (eV) | Area (CPS · eV) | Atomic % |
|---|---|---|---|---|---|
| Si2p | 101.6 | 2414.6 | 1.6 | 4399.1 | 0.9 |
| P2p | 133.5 | 372.5 | 0.7 | 405.1 | 0.1 |
| C1s C—C | 284.8 | 108606.2 | 1.4 | 166006.8 | 35.2 |
| C1s C—O | 286.4 | 69222.8 | 1.4 | 105003.1 | 22.3 |
| C1s COO | 288.8 | 36701.2 | 1.2 | 46030.0 | 9.8 |
| N1s | 402.3 | 588.5 | 0.2 | 779.4 | 0.1 |
| O1s | 532.6 | 148341.6 | 2.3 | 359163.9 | 31.5 |
| Na1s | 1071.6 | 2878.7 | 1.2 | 4423.9 | 0.2 |

As shown in tables 1 and 2, the atomic percentage of the silicon and phosphorous at the surface of Working Example 1 was much higher than Comparative Example A. The silicon atomic percentage at the surfaces of Working Example 1 was at least double that of Comparative Example A. Even more notably, the phosphorus atomic percentage at the surfaces Working Example 1 was at least 7 times higher than in Comparative Example A. Tables 1 and 2 illustrate that the SIGMA-PC front surface has Si and P higher than front surface of SiGMA+MPC.

Similar results to those disclosed above in Tables 1-2 were also observed for samples with six times SiGMA-PC and separate SiGMA and PC monomers, respectively.

By using a SiGMA-PC monomer rather than separate SiGMA and MPC monomers, it is believed that the PC functional groups can orient and/or migrate to the surface of a lens with the aid of the attached siloxane groups in the SiGMA portion of the SiGMA-PC monomer.

Working Example 2

For Working Example 2, ophthalmic lenses containing 3 wt %, 8 wt % and 13 wt % of the aforementioned SiGMA-PC monomer were prepared. The other compositions listed above were also included, such as methacrylic acid monomers and derivatives thereof (including GMA, HEMA, MA, MAA, and EGDMA, where the GMA and HEMA comprised the majority of the methacrylic acid monomers and derivatives thereof), BME and BHPEA. Working Example 2 was formed as a solution and spin cast in a mold to form a contact lens with a front convex surface and a back concave surface.

Each lens was then immersed in ultrapure water for more than 24 hours. A 1 cm×1 cm square lens fragment was cut out from the center of each lenses using a scissors and allowed to air drying. A front surface, back surface, and cross section of the 1 cm×1 cm square lens fragments were then analyzed via SEM/EDS analysis using scanning electro microscopy JSM 6010LA from NIHON DENSHI Inc. (mode: backscattered electron image, acceleration voltage: 10.0 kV, spotsize: 60) to determine the atomic percent of C, O, Si, and P at each surface. The results are illustrated in Table 3 below.

TABLE 3

| | | C(atomic %) | O(atomic %) | Si(atomic %) | P(atomic %) |
|---|---|---|---|---|---|
| SiGMA-PC 3% | Front Surface | 74.98 | 24.77 | 0.25 | |
| | Back Surface | 80.41 | 19.37 | 0.22 | |
| | cross section | 77.07 | 22.74 | 0.09 | |
| SiGMA-PC 8% | Front Surface | 74.24 | 24.62 | 0.81 | 0.31 |
| | Back Surface | 75.77 | 23.33 | 0.69 | 0.26 |
| | cross section | 76.74 | 22.78 | 0.48 | |
| SiGMA-PC 13% | Front Surface | 75.51 | 22.82 | 1.21 | 0.47 |
| | Back Surface | 73.8 | 24.9 | 0.96 | 0.35 |
| | cross section | 72.93 | 26.44 | 0.63 | |

Table 3 illustrates that the front surface of each SiGMA-PC ophthalmic lens has a higher concentration of Si atoms than the interior portion and the back surface of the ophthalmic lens. Additionally, the front surface of the SiGMA-PC ophthalmic lens has a demonstrably higher concentration of P atoms than the back surface, as illustrated using SiGMA-PC 8% and SiGMA-PC 13%.

Table 4 illustrates a number of example compositions used to form a contact lens, according to the present exemplary systems and methods. The measured properties of each of the example compositions represented below as Samples 1-8 are provided below with reference to Table 5, obtained after evaluating the compounding ratio (wt %) of the raw material and the properties of the compositions.

TABLE 4

| Composition | Sample 1 | Sample 2 | Sample 3 | Sample 4 | Sample 5 | Sample 6 | Sample 7 | Sample 8 |
|---|---|---|---|---|---|---|---|---|
| SiGMA | 0 | 5 | 0 | 0 | 0 | 0 | 0 | 0 |
| SiGMA-PC | 5 | 0 | 5 | 0 | 0 | 10 | 20 | 5 |
| HEMA | 85 | 85 | 85 | 85 | 85 | 80.5 | 71.6 | 80 |
| GMA | 10 | 10 | 0 | 15 | 0 | 9.5 | 8.4 | 0 |
| MPC | 0 | 0 | 10 | 0 | 15 | 0 | 0 | 15 |
| EDMA | 0.5 | 0.5 | 0.5 | 0.5 | 0.5 | 0.5 | 0.5 | 0.5 |
| BME | 0.5 | 0.5 | 0.5 | 0.5 | 0.5 | 0.5 | 0.5 | 0.5 |
| TOTAL | 101.0 | 101.0 | 101.0 | 101.0 | 101.0 | 101.0 | 101.0 | 101.0 |

TABLE 5

| Properties of the composition | | | | | | | | |
|---|---|---|---|---|---|---|---|---|
| | Sample 1 | Sample 2 | Sample 3 | Sample 4 | Sample 5 | Sample 6 | Sample 7 | Sample 8 |
| Tensile strength (Mpa) | 0.281 | 0.345 | 0.258 | 0.306 | 0.225 | 0.221 | 0.129 | 0.188 |
| Young's modulus (Mpa) | 0.268 | 0.278 | 0.233 | 0.222 | 0.215 | 0.410 | 0.579 | 0.195 |
| Total elongation (%) | 151 | 177 | 158 | 206 | 153 | 74 | 26 | 132 |
| Handling (lens) | ○ | ○ | ○ | ○ | ○ | ○ | X | X |
| Relaxation rate (%) | 3.6 | 5.6 | 3.2 | 5.5 | 3.5 | 2.2 | 1.5 | 3.6 |
| Dynamic friction (mN) | 36 | 67 | 25 | 31 | 65 | 35 | 54 | 50 |

As shown in Table 5, the tensile strength and total elongation of each sample was evaluated. When evaluating the properties illustrated in Table 5, the following measurement procedures and equipment were used:

Dynamic Friction—An autograph AS-IG MS type manufactured by Shimadzu Corporation was used for the dynamic friction test. After immersing the test lens in distilled water for about 16 hours or more, the aqueous solution adhering to the lens surface was wiped off. After repositioning the lens such that the front curve of the test lens was faced down, a hemispherical jig (Made of plastic resin, about 17 g) was placed on the test lens. The jig with the test lens was then placed on a horizontal glass plate. The position of the jig and the test lens was fixed. 2 μL of ISO physiological saline was then added to the contact point between the test lens and the glass plate. The glass plate was slid horizontally under the conditions of a tensile speed of 700 mm/min and a tensile distance of 30 mm. The frictional force between the test lens and the glass plate was measured. The average value of the region where the frictional force was stable after the tensile distance of 10 mm was calculated. The dynamic friction force was obtained from the results of about 5 test lenses.

Young's Modulus—The autograph AS-IG MS type manufactured by Shimadzu Corporation was also used for the Young's modulus test. The test included a test plate having a thickness of about 0.3 mm and a diameter of about 25 mm being punched into a dumbbell shape. (JIS-K-7162-1994 "Plastics—Determination of tensile properties—Part 2: Test conditions for moulding and extrusion plastics). The central part of the dumbbell shape was about 2 mm wide and about 6 mm long.

Total Elongation—The autograph AS-IG MS type manufactured by Shimadzu Corporation was also used for the total elongation test. The test included a test plate having a thickness of about 0.3 mm and a diameter of about 25 mm being punched into a dumbbell shape. (JIS-K-7162-1994 "Plastics—Determination of tensile properties—Part 2: Test conditions for moulding and extrusion plastics). The central part of the dumbbell shape was about 2 mm wide and about 6 mm long. After a sample punched into a dumbbell shape was immersed in a physiological saline solution at 20° C. for about 16 hours or more, the sample was then used as a test piece for total elongation measurement. Total elongation was obtained by a tensile test in physiological saline at 20° C. The marked line distance of the test piece before starting the tension was defined as L. The tensile test was performed at a speed of 20 mm/min. The increase in the mark line distance of the test piece at the time of fracture was defined as ΔL. Total elongation (l) was then calculated according to a formula (VII) given below.

$$[\text{Total elongation: } l(\%)]=(\Delta L/L) \times 100 \quad \text{Formula (VII)}$$

Total elongation, as detailed in this Working Examples section was obtained from the results of more than 6 test pieces.

Relaxation Rate—The autograph AS-IG MS type manufactured by Shimadzu Corporation was also used for the stress relaxation rate test. The test included a test plate having a thickness of about 0.3 mm and a diameter of about 25 mm being punched into a dumbbell shape. (JIS-K-7162-1994 "Plastics—Determination of tensile properties—Part 2: Test conditions for moulding and extrusion plastics). The central part of the dumbbell shape was about 2 mm wide and about 6 mm long. After a sample punched into a dumbbell shape was immersed in a physiological saline solution at 20° C. for about 16 hours or more, it was then used as a test piece for the stress relaxation rate measurement. The stress relaxation rate was obtained by a tensile test in physiological saline at 20° C. The test piece was started to be pulled at a speed of 20 mm/min. When the measured stress reached 0.1 N, the tension was stopped immediately, and the stress immediately after the stop was defined as L1. The stress after 30 seconds from the stop of tension was defined as L2. The stress relaxation rate (r) is calculated according to a formula (VIII) given below.

$$[\text{The stress relaxation rate: } r(\%)]=[(L1-L2)/L1] \times 100 \quad \text{Formula (VIII)}$$

The stress relaxation rate was obtained from the results of more than 3 test pieces.

After a sample punched into a dumbbell shape was immersed in a physiological saline solution at 20° C. for about 16 hours or more, the dumbbell shape was then used as a test piece for Young's modulus measurement. Young's modulus was determined from the initial slope of the stress-strain curve obtained by a tensile test at a rate of 20 mm/min in physiological saline at 20° C. Young's modulus was obtained from the results of more than 6 test pieces.

As illustrated in Table 5, the tensile strength and total elongation of the Sample 7 were much lower than that of Samples 1 and 3. In addition, the Young's modulus of Sample 7 was much higher than that of Samples 1 and 3. Due to these measurements, Sample 7, as manufactured and tested, does not have enough strength to perform well as a contact lens. While the material itself may be insufficient, Applicant believes that the handling of Sample 7 may have been bad, resulting in erroneous results. It can be inferred from the measured results of Table 5 that the silicone monomer is preferably included at a wt % of less than or equal to 10%.

As shown in Table 5, the tensile strength of Sample 8 was much lower than that of Samples 1 and 3. Consequently, Sample 8 may undesirably have insufficient strength to be used as a contact lens. Therefore, it can be inferred that the non-silicone monomer containing the phosphorylcholine is preferably included at a wt % of less than or equal to 10%.

Furthermore, as shown in Table 5, the relaxation rate of Samples 1, 3, 5, and 6 were much lower than the relaxation rate of Samples 2 and 4. The contact lenses which have low relaxation rate have a higher ability to recover from deformation. Similarly, the dynamic friction values of Samples 1, 3, 4, and 6 were much lower than that of Samples 2 and 5. The contact lenses which have low dynamic friction, such as Samples 1, 3, 4, and 6, decrease the friction with the eyelid during use, resulting in an increased perceptible comfort level. As illustrated in Table 5, the contact lenses containing SiGMA-PC perform well with regard to relaxation rate and dynamic friction.

Consequently, as can be illustrated with respect to Samples 1, 4, 5, and 6, the non-silicone monomer containing phosphorylcholine can exhibit sufficient strength for use as an ophthalmic lens, while providing desirable wetting and oxygen permeability levels.

All ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

As used herein, the term "about" refers to an allowable variance of the term modified by "about" by ±10% or ±5%. Further, the terms "less than," "or less," "greater than", "more than," or "or more" include as an endpoint, the value that is modified by the terms "less than," "or less," "greater than," "more than," or "or more."

The invention claimed is:

1. A hydrogel polymer formed from a monomer mixture comprising:
   at least one zwitterionic silicone monomer;
   at least one non-silicone containing (meth)acrylic monomer;
   wherein the at least one non-silicone containing (meth)acrylic monomer is a glyceryl methacrylate; and
   wherein the zwitterionic silicon monomer comprises between 0.1-9 wt % of the hydrogel polymer; and
   wherein the glyceryl methacrylate comprises between 10-20 wt % of the hydrogel polymer.

2. The hydrogel polymer according to claim 1, wherein the polymer comprises at least one additional (meth)acrylic monomer selected from the group including (hydroxyethyl) methacrylate, ethylene glycol dimethacrylate, methacrylic acid, acrylamide, N,N-dimethylacrylamide, N,N-diethylacrylamide, N,N-diisopropylacrylamide, N,N-dimethylacetamide, N-vinylpyrrolidinone, or combinations thereof.

3. The hydrogel polymer according to claim 1, wherein the zwitterionic group comprises one of a phosphorylcholine, alkyl carbobetaine, alkylamide carbobetaine, alkyl sulfobetaine, alkylhydroxy sulfobetaine, alkylamide sulfobetaine, alkylamidehydroxy sulfobetaine and thereof.

4. The hydrogel polymer according to claim 1, wherein the relaxation rate of the hydrogel polymer is less than 5.5%.

5. The hydrogel polymer according to claim 4, wherein the relaxation rate is less than 4.0%.

6. The hydrogel polymer according to claim 1, wherein a dynamic friction of the hydrogel polymer comprises less than 50 mN.

7. The hydrogel polymer according to claim 6, wherein the dynamic friction comprises less than 40 mN.

8. The hydrogel polymer according to claim 1, wherein the silicone monomer comprises isomers conforming to formulae (Ia) to (Ic):

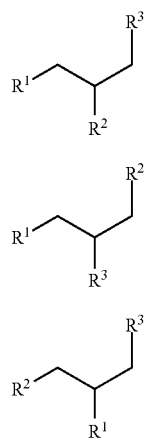

wherein:
R$^1$ is a group containing a polymerizable moiety comprising, but not limited to, methacryloyl, acryloyl, styryl, or allyl;

R$^2$ is a group containing a C1-C15 alkenyl group terminated in a silicone moiety of structure (II), where R$^2$ is a group containing a C1-C15 alkenyl group terminated in a silicone moiety of structure (II), where R$^4$ is either —CH$_3$ or —[—Si(CH$_3$)$_2$—O—]$_n$—Si(CH$_3$)$_3$ where n=0–50;

R$^3$ is a zwitterionic group, including, but not limited to phosphorylcholine, betaine, sulfobetaine, or amphoacetate

9. The hydrogel polymer according to claim 8, wherein the hydrogel polymer includes between 0 and 10 wt % of a non-silicone monomer containing phosphorylcholine.

10. An ophthalmic lens, comprising:
    a body formed from the hydrogel polymer of claim 1 including:
    a front surface configured to face away from a wearer;
    a back surface configured to contact an eye of the wearer; and
    a greater amount of silicone monomer including at least one zwitterionic group at the front surface than at a point in the body between the front surface and the back surface.

11. The ophthalmic lens of claim 10, wherein a total silicone ratio of the hydrogel polymer is 0.1-9 wt %.

12. The ophthalmic lens of claim 10, wherein the relaxation rate of the hydrogel polymer is less than 5.5%.

13. The ophthalmic lens of claim 10, wherein the dynamic friction of the hydrogel polymer comprises less than 50 mN.

14. The ophthalmic lens of claim 10, the silicone monomer including at least one zwitterionic group comprising one of SIGMA-PC or SiMA-PC; and
    a plurality of hydrophilic monomers of the hydrogel polymer further comprises sodium methacrylate.

15. The ophthalmic lens of claim 14, wherein the polymer is also formed from at least one monomer selected from the group of glyceryl methacrylate, (hydroxyethyl)methacrylate, ethylene glycol dimethacrylate, methacrylic acid, acrylamide, N,N-dimethylacrylamide, N,N-diethylacrylamide, N,N-diisopropylacrylamide, N,N-dimethylacetamide, N-vinylpyrrolidinone, or a combination of any of the foregoing.

16. The ophthalmic lens of claim 14, wherein:
    the body has a larger concentration of SIGMA-PC or SiMA-PC at the front surface than at the back surface;
    the lens includes an oxygen transmissibility value (Dk/thickness) greater than 20; and
    the lens exhibits a Young's modulus of about 0.1 MPa to about 0.5 MPa.

17. A method of making a contact lens, comprising:
    applying a liquid lens material into a mold; and
    curing the liquid lens material in the mold;
    wherein the liquid lens material includes a plurality of monomers, the plurality of monomers including at least some 3,5, 8, 13-tetraoxa-4-phospha-12, 14-disilapentadecan-1-aminium, 4-hydroxy-N,N,N,12,14,14-hexamethyl-6-[[(2-methyl-1-oxo-2-propen-1-yl)oxy]methyl]-12-[(trimethylsilyl)oxy]-, inner salt, 4-oxide ("SIGMA-PC") monomer units, a glyceryl methacrylate, wherein the glyceryl methacrylate comprises between 10-20 wt % of the liquid lens material.

18. The method of claim 17, wherein the mold comprises a spin-cast mold; and
curing the liquid material comprises spinning the liquid lens material while at least partially curing the liquid lens material.

19. The method of claim 17, wherein the mold comprises a cast mold.

20. The method of claim 17, wherein at least one mold surface of the mold is treated so as to modify its surface energy.

21. The hydrogel polymer of claim 1, wherein the zwitterionic silicon monomer comprises between 0.1-6 wt % of the hydrogel polymer.

\* \* \* \* \*